(12) United States Patent
Duranti et al.

(10) Patent No.: US 8,186,860 B2
(45) Date of Patent: May 29, 2012

(54) SYSTEM FOR ON-GROUND SIMULATION OF THE AMBIENT LIGHTING CONDITIONS IN THE COCKPIT OF AN AIRCRAFT DURING FLIGHT

(75) Inventors: Pierluigi Duranti, Caselle Torinese (IT); Angiolo Barneschi, Arezzo (IT)

(73) Assignees: Alenia Aeronautica S.p.A (IT); Bertolotti S.p.A. (IT)

( * ) Notice: Subject to any disclaimer, the term of this patent is extended or adjusted under 35 U.S.C. 154(b) by 437 days.

(21) Appl. No.: 12/519,875

(22) PCT Filed: Dec. 10, 2007

(86) PCT No.: PCT/IB2007/054978
§ 371 (c)(1), (2), (4) Date: Jun. 18, 2009

(87) PCT Pub. No.: WO2008/081367
PCT Pub. Date: Jul. 10, 2008

(65) Prior Publication Data
US 2010/0033979 A1   Feb. 11, 2010

(30) Foreign Application Priority Data
Dec. 27, 2006 (IT) .............................. TO2006A0923

(51) Int. Cl.
*F21V 21/00* (2006.01)

(52) U.S. Cl. ...................................... 362/471; 362/470

(58) Field of Classification Search .................. 362/1, 2, 362/287, 296.07, 296.08, 296.09, 297, 341, 362/346, 348, 470, 471
See application file for complete search history.

(56) References Cited

U.S. PATENT DOCUMENTS

| 3,321,620 | A | | 5/1967 | Miles et al. | |
| 5,158,497 | A | * | 10/1992 | Rossignol et al. | 119/6.5 |
| 2005/0237750 | A1 | * | 10/2005 | Opolka | 362/341 |
| 2005/0270781 | A1 | * | 12/2005 | Marks | 362/346 |

FOREIGN PATENT DOCUMENTS

| DE | 100 45 028 A1 | 4/2002 |
| FR | 2 898 586 A1 | 9/2007 |
| WO | WO 2008/081367 A2 | 7/2008 |

OTHER PUBLICATIONS

International Search Report re application No. PCT/IB2007/054978, dated Jun. 23, 2008.
Written Opinion re application No. PCT/IB2007/054978, dated Jun. 23, 2008.

* cited by examiner

*Primary Examiner* — Y My Quach Lee
(74) *Attorney, Agent, or Firm* — Husch Blackwell LLP

(57) ABSTRACT

A dome structure has dimensions such as to house the cockpit of an aircraft. An ordered arrangement of light-emitting panels (10), able to be switched on or off selectively, forms at least a part of the inner vault of the dome. A floodlight (16) is mounted on a movable support arm (17) such that it can be selectively positioned around or above the cockpit and directed so as to project a beam of light onto the cockpit. Preferably a part of the inner vault of the dome consists of an ordered arrangement of reflective panels (11).

12 Claims, 4 Drawing Sheets

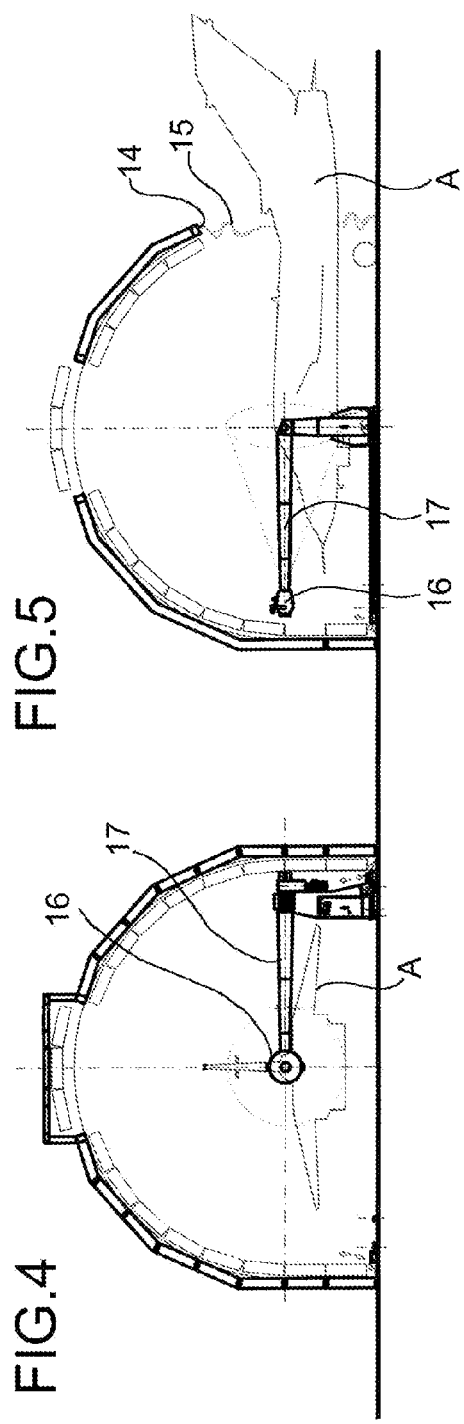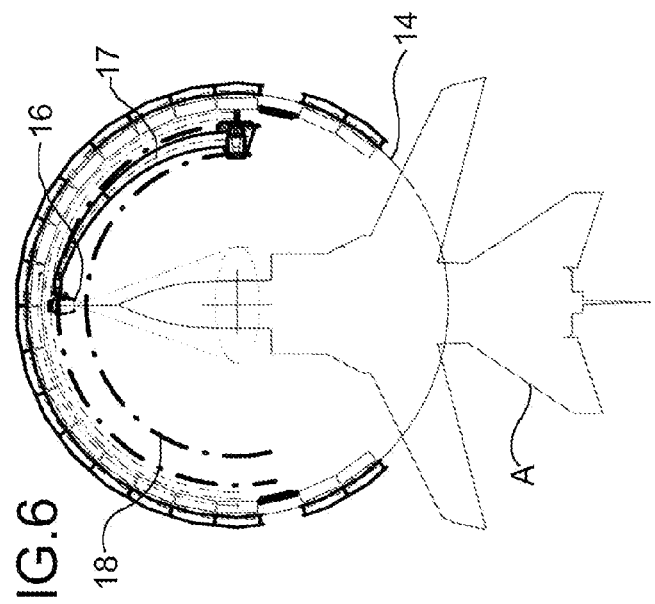

SYSTEM FOR ON-GROUND SIMULATION OF THE AMBIENT LIGHTING CONDITIONS IN THE COCKPIT OF AN AIRCRAFT DURING FLIGHT

The present invention relates to an on-ground simulation system able to recreate artificially, in a special environment which is capable of housing an entire aircraft or at least its cockpit, the natural lighting conditions which this aircraft may encounter during its operational use.

The cockpit of a modern aircraft has a plurality of instruments and displays which provide the pilot with all the necessary information. During daytime flying, unfavourable static or dynamic light conditions may occur and create critical situations associated with the poor visibility in particular of the displays (for example of the LCD and CRT type) which are greatly influenced by the direction of the light and the contrast conditions. Difficult lighting conditions occur, for example, in the following cases: direct sunlight or sunlight which is reflected on the displays as a result of the sun being situated at the rear or on the side of the cockpit; very bright dazzling light reflected by the clouds; changing lighting conditions at dawn or sunset, when the sun is situated close to the horizon and cockpit which is illuminated with night-time lighting. Night-time flying may also give rise to critical conditions if image intensifiers ("night vision goggles") are in use, since they require a suitable emission spectrum and a given brightness level of the lighting inside the cockpit.

The pilot must always have a good visibility of the on-board instruments in any external lighting conditions and must also be able to see outside without interference from the light sources inside the cockpit which could dazzle the pilot directly or as a result of reflection on the transparent canopy.

It is therefore necessary to develop techniques and systems which allow the designer to optimise and harmonise the configuration of the cockpit in terms of the position and nature of the various displays (needle, CRT or LCD type), brightness and colour quality of the displays, amount of information displayed, arrangement of the internal and external light sources, and also in terms of colour and reflecting capacity of the surface as well as the priorities to be signalled to the pilot.

Hitherto the validity of the lighting system was checked only by conducting test flights, involving high costs and a certain degree of risk due to the in-flight testing activities performed, with variable results owing to the difficult repeatability of the conditions tested.

The object of the invention is to overcome the drawbacks mentioned above and in particular to simulate on the ground in a repeatable, reliable, certain and economical manner the lighting environment to which the equipment inside the cockpit is exposed during flying, in order to optimise the choice as to the type and position of light sources present therein (displays, luminous panels and luminous sources in general).

It is desired to propose a system which allows studies and checks to be carried out both during design of a new aircraft and during upgrading of an existing aircraft, where the installation of new or different on-board instruments is envisaged.

These and other objects and advantages, which will be better understood below, are achieved according to the invention by a system which has the characteristic features defined in claim 1. Preferred embodiments of the invention are defined in the dependent claims.

A preferred, but non-limiting embodiment of the invention will now be described. Reference is made to the accompanying drawings in which:

FIGS. 4 and 5 are vertically sectioned schematic views along respective planes which are transverse and longitudinal relative to the longitudinal axis of the fuselage of an aircraft, the cockpit of which is arranged at the centre of the dome according to FIGS. 1-3;

FIG. 6 is a plan view of the configuration shown in FIGS. 4 and 5;

Figure 1:
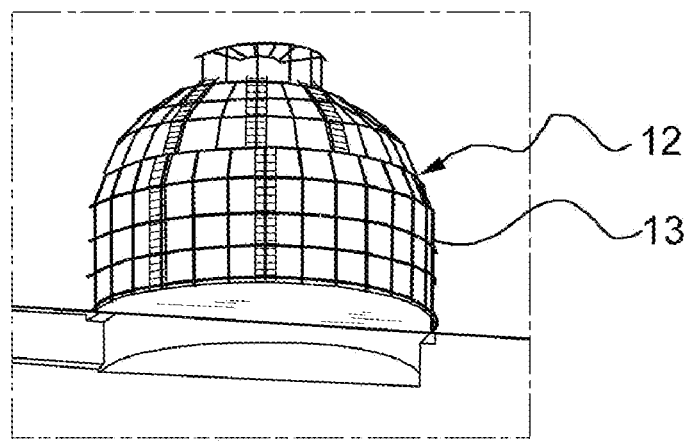
FIG. 1 is a schematic perspective view which shows the structure supporting the dome of a system according to the invention.
Figure 2:
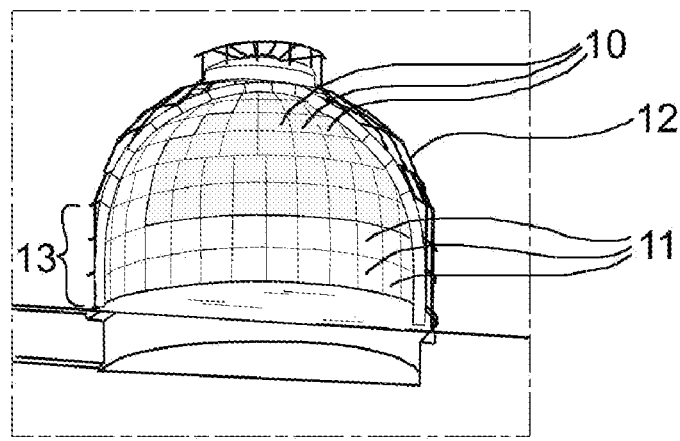
FIG. 2 is a schematic perspective view which shows the panels supported by the structure according to FIG. 1.
Figure 3:
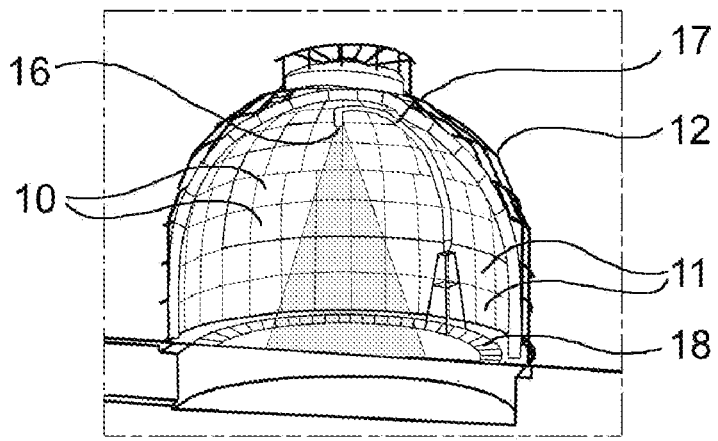
FIG. 3 is a view similar to FIG. 2 and showing also a sun simulation lamp.

Referring initially to FIGS. 1-3, a system according to the invention comprises a mesh-like metallic structure 12 with a hemispherical dome, the inner vault or covering of which consists of an ordered arrangement of light-emitting panels 10 and reflective panels 11 which have the function of reproducing artificially a diffused light condition in the sky, as described more clearly below. In the simulation system according to the invention, the sky is not regarded as a continuous surface, but is reproduced discretely by a given number of polygonal panels.

By way of a non-limiting example, the dome has an internal diameter of 12 m so as to be able to house the front part of the fuselage of a small-size aircraft A or a medium-size transportation aircraft. The dome may be equally well formed as a hemisphere which extends underneath the horizon line through at least 24° or (as in the embodiment shown in the drawings) as a hemisphere mounted on top of a vertical cylindrical drum 13 having the same radius as the dome and being lined internally with light-emitting panels 10 and/or reflective panels 11. The surface of the dome is interrupted by an opening 14 for allowing the entry of the front part of the fuselage of the aircraft being tested. A rail-type movement system (not shown) allows the aircraft to be towed inside the dome, positioning the cockpit in the centre thereof. The possibility of installing in the system a raisable platform (not shown) for positioning the cockpit, and therefore the pilot's head, in the centre of the dome, is also envisaged.

With the aircraft arranged as shown in FIG. 5, the opening 14 is then sealed by curtains or screens 15 which isolate the internal lit environment from the external environment. The lighting conditions inside the dome must be able to be completely controlled artificially and not be affected by (chinks of) light entering from outside.

The light-emitting panels 10 are lit with the possibility of adjusting their intensity, or switched off, depending on the lighting conditions which are to be created and for which it is required to verify the "readability" of the on-board instrumentation and the simultaneous possibility of the pilot being able to see outside.

Figure 9:
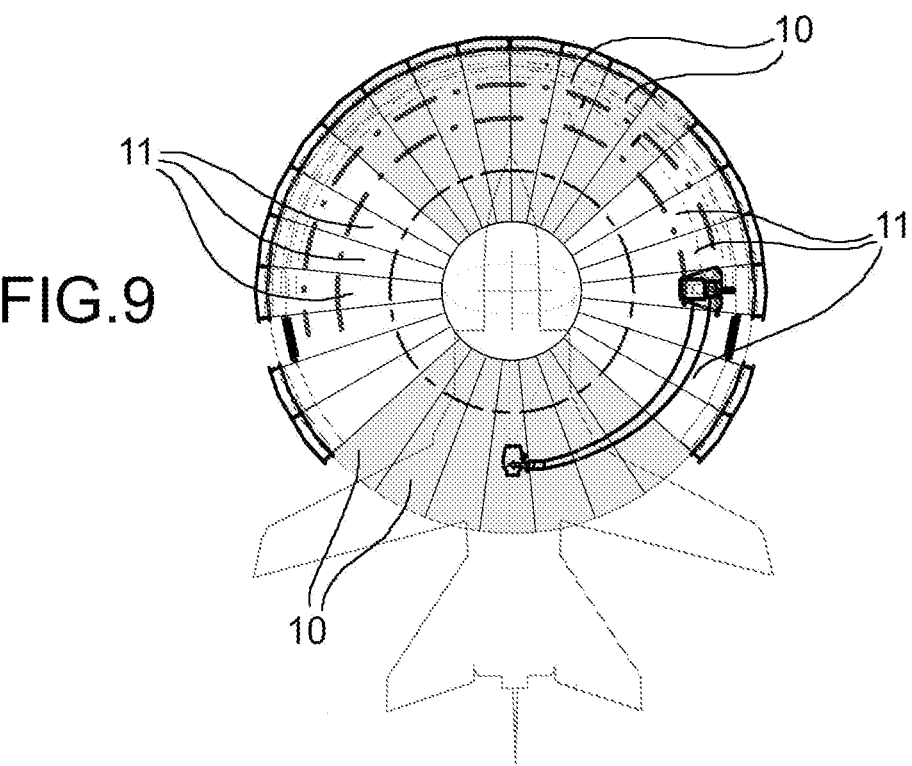
FIG. 9 is a schematic plan view which shows distribution of the light-emitting panels and the reflective panels on the inner vault of the dome.

As shown schematically in FIG. 9, the light-emitting panels 10 are preferably concentrated in the front and rear zone of the dome in an arrangement distributed in the manner of lunes. This configuration ensures that the panels 10, when lit, give rise to one of the visibility conditions considered to be most critical for the pilot: dazzling effect due to a lot of light from the front; and mirror-like reflection on the instrument displays of the light from behind. This condition is, for example, useful for evaluating the use of certain types of display, the information on which is poorly visible when the surrounding light is particularly strong. As an alternative to the example shown, the light-emitting panels 10 may line the whole of the inside of the dome.

The light-emitting panels 10 may contain equally well fluorescent tubes, or LED arrays, or light sources of another kind, the luminous intensity of which may be modulated with different voltage levels so as to emit more or less light with a view to recreating artificially, in a selective manner, lighting conditions representing some particularly critical conditions which the pilot may encounter whilst flying. The fluorescent tubes are covered by a diffusing screen which ensures the uniformity of the light emitted by each panel. The switching-on and modulation of each light-emitting panel or each subassembly of light sources forming a panel is controlled individually by software which allows suitable mapping of various sky illumination models.

The light-emitting or reflective panels which line the cylindrical drum 13 at the base of the dome have the function of recreating another critical visibility situation, where the aircraft is situated above a blanket of clouds while the sky above is clear with radiant sunshine. This is a "saturation" light condition where the panels in the base drum simulate the layer of clouds which reflect the sunlight.

Figure 7:
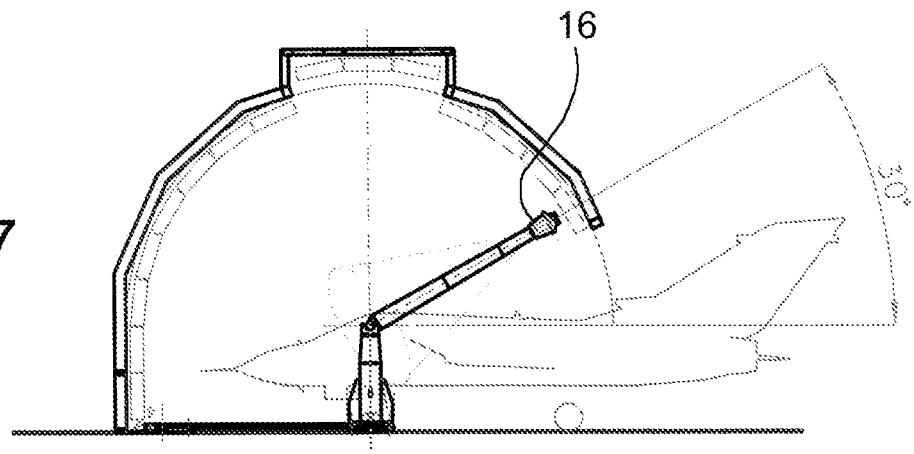
FIGS. 7 and 8 are views similar to FIG. 5, but with the sun simulation lamp in two further positions.
Figure 8:
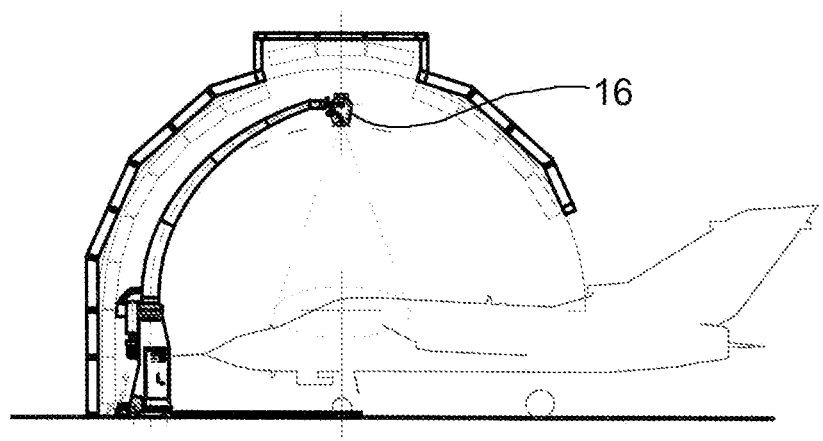

A powerful directable floodlight 16 (for example with a power of 12 kW) has the function of simulating the direct light from the sun. The floodlight 16 is designed to have the same apparent size as the round ball of sun viewed from the cockpit which is situated in the centre of the dome and is able to concentrate the light onto the cockpit and provide a lighting strength of at least 150,000 lux in the centre of the dome. The floodlight 16 is mounted on an articulated curved arm 17, the base of which is able to travel along a curved rail 18 situated at the bottom of the dome. The azimuth and height of the articulated arm 17 are adjustable so as to arrange the floodlight or "sun" 16 virtually in any position around or above the cockpit and in any case in the most critical positions as regards visibility. For example, in FIGS. 4 to 6, the "sun" 16 is situated directly in front on the horizon; in FIG. 7 it is inclined at 30° at the rear of the aircraft and in FIG. 8 it is situated at its highest point. By varying the position of the floodlight 16, which can be directed so as to project onto the cockpit a beam of light which simulates the direct sunlight and, if necessary, by adjusting the light-emitting panels 10 depending on the conditions which are to be recreated, it is possible to verify the visibility of the on-board instruments virtually in any condition.

Figure 10:
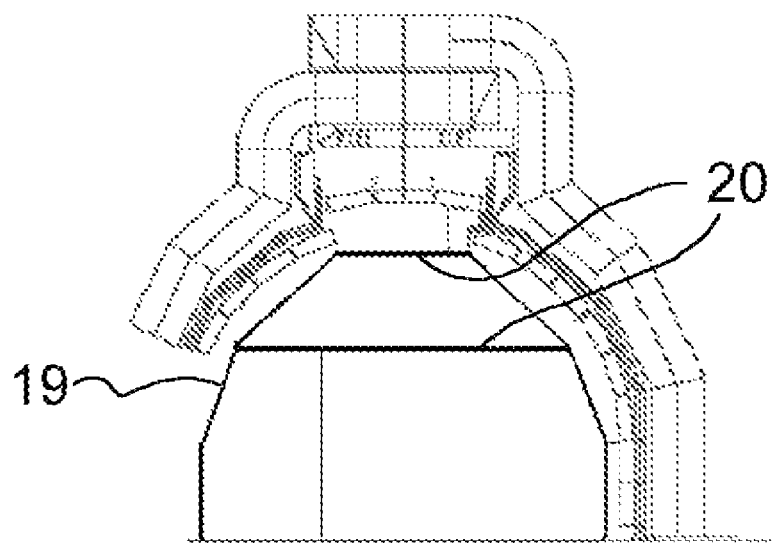
FIGS. 10 and 11 are, respectively, a vertically sectioned view and a plan view which show schematically a series of curtains for recreating total darkness conditions around the cockpit.
Figure 11:
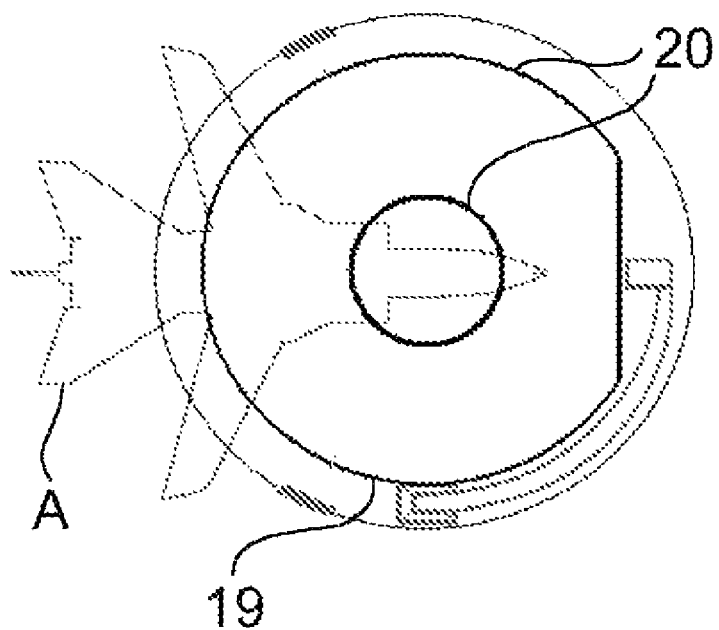

With the system according to the invention it is possible to create darkness conditions in order to simulate night time flights, for example so as to check the suitability of the cockpit for use with image intensifiers ("night vision goggles"). As shown schematically in FIGS. 10 and 11, a series of black opaque curtains 19 supported on metal rings 20 can be raised by means of winches so as to obscure completely the zone surrounding the aircraft cockpit. A suitable light source (not shown) simulates different night-time lighting conditions, for example a full moon, quarter moon, star light, etc.

In order to verify the effectiveness, in particular, of the so-called "Head-Up Display" (HUD), the system may envisage a pair of floodlights (not shown) which illuminate a reflective panel (not shown) situated in front of the pilot. This has the function of simulating a dazzling condition due to the diffused light of surrounding clouds, with particular attention to the field of vision of the pilot during reading of the symbols which appear on the display, for example on the HUD.

The system according to the present invention is moreover equipped with:
- a cooling and conditioning plant which performs ventilation of each individual panel, ensuring not only cooling thereof during operational use, but also elimination of any inflammable vapours and conservation of the chromatic properties of the light;
- a subassembly designed to perform cooling of the solar floodlight;
- a subassembly for detecting/signalling inflammable vapours, smoke and fire and for extinguishing fires; and
- a TV intercommunication and monitoring system which allows communication between the personnel operating the system and the personnel in the aircraft cockpit who are recording the luminosity and visibility conditions created by the system. The illumination of the various light sources of the system and the movement of the associated support means is performed by means of software and/or commands which are emitted by an electronic control and processing unit 21—typically a PLC (Programmable Logic Controller) or a PC (Personal Computer)—which supervises operation of the system overall and therefore also operation of all the driving/actuating members described here. The electronic control and processing unit 21 therefore performs:
- monitoring of the main systems and subsystems of the installation (lighting, electrical, fire detection and cooling systems);
- control of the lighting system (vault panels, sun simulator, moon/star simulator), electrical and alarm system;
- data processing (test reports, panel performance and warning diagrams).

It is envisaged providing the possibility of controlling the various light sources of the system in order to perform both "static" and "dynamic" light tests, with a continuous or sudden variation of the light.

As can be understood, the present invention provides the possibility of performing test activities, without having to take into account the weather conditions (which may instead hinder execution of in-flight tests). Moreover, with the system it is possible to reproduce, on the ground, lighting conditions which are required by the regulations for certification of the aircraft and which are difficult to achieve during flights.

Experts in the aeronautical sector will note that the system according to the invention overcomes the limitations of other lighting facilities which at present exist throughout the world, namely:
- limited dimensions: the invention, instead, is able to cover a range of −24° to +90° in the vertical plane and 360° in the azimuthal plane;
- the limited lighting levels which can be achieved: with the invention, instead, it is possible to create at least 150,000 lux in the vault centre for the sun and at least 10,000 $cd/m^2$ for the light-emitting panels.
- the poor uniformity and distribution of the light: in the system according to the invention, the standard deviation as regards uniformity is 10%;
- the unrealistic size of the "sun": in the system according to the invention, instead, the size of the floodlight 16 is such as to reproduce the apparent size of the sun;
- the impossibility of using real aircraft during the cockpit lighting tests.

By simulating on the ground in a repeatable and reliable manner the lighting environment to which the equipment is operationally exposed during flying, the simulation system allows the on-ground design and testing of the visual interface, reducing the costs and the risks associated with in-flight testing activities.

Owing to its modular design and the light-emitting panels, the system is able to house internally not only simulated cockpits of almost any size (therefore constituting a valid tool during design and testing of the visual interface of any new aircraft), but also the fuselage part containing the cockpit of aircraft of varying sizes, including those with medium-size bodies (such as the B737), therefore also providing a valid tool for testing and validating, on the ground, modifications made to already existing aircraft or aircraft in the advanced stage of design.

Besides being used for the tests relating to the lighting system of aircraft, the system according to the present invention may be used for test activities in connection with the following:
- evaluation of the lighting system of helicopters;
- evaluation of the lighting system of vehicles (land vehicles, motorcars, lorries, etc.);
- evaluation of architectural designs, to be applied to models or to real structures/components;
- any evaluation of a man/machine interface which involves the surrounding lighting.

The invention claimed is:

1. System for on-ground simulation of lighting conditions on a in the cockpit of an aircraft (A), comprising:
   - a dome structure sized to house at least the cockpit of the aircraft;
   - an ordered arrangement of light-emitting panels (10) forming at least a part of the inner vault of the dome structure, able to be lit or switched off selectively;
   - a floodlight (16) mounted on movable support means (17) such that it can be selectively positioned around or above the cockpit and directed so as to project a beam of light onto the cockpit.

2. A system according to claim 1, further comprising an ordered arrangement of reflective panels (11) forming at least a part of the inner vault of the dome.

3. A system according to claim 2, further comprising a vertical cylindrical drum structure (13) on which said dome structure is mounted and having an inner surface lined with reflective panels (11).

4. A system according to any one of the preceding claims, having an opening (14) at a base of the structure for allowing the entry of the front part of the aircraft fuselage.

5. A system according to claim 4, comprising opaque screen means (15) associated with the opening (14) for sealing off the space between the said opening and the aircraft which passes through it.

6. A system according to claim 1, wherein the light-emitting panels (10) are individually adjustable so as to emit light of variable intensity.

7. A system according to claim 1, wherein the floodlight (16) is designed so as to have the same apparent size as a round ball of sun viewed from the cockpit situated in a centre of the dome structure.

8. A system according to claim 1, wherein the floodlight (16) is mounted on an articulated arm (17), the height and azimuth of which can be adjusted.

9. A system according to claim 8, wherein the articulated arm (17) is slidable along a curved rail (18) situated at a bottom of the dome structure.

10. A system according to claim 8, wherein the articulated arm (17) comprises a curved part.

11. A system according to claim 1 or 2, wherein the light-emitting panels (10) are concentrated in two opposite zones relative to a top of the dome structure, so as to illuminate zones of the dome structure arranged at the front and rear of the cockpit situated approximately in a centre of the dome structure.

12. A system according to claim 1, further comprising opaque screen means (19) mounted movably inside the dome structure so as to obscure a zone surrounding the cockpit.

* * * * *